(12) United States Patent
Lee

(10) Patent No.: US 6,504,959 B1
(45) Date of Patent: Jan. 7, 2003

(54) IMAGE PROCESSING APPARATUS USING A CASCADE OF POLY-POINT OPERATIONS

(76) Inventor: Shih-Jong J. Lee, 15418 SE. 53rd Pl., Bellevue, WA (US) 98006

( * ) Notice: Subject to any disclaimer, the term of this patent is extended or adjusted under 35 U.S.C. 154(b) by 54 days.

(21) Appl. No.: 09/693,378

(22) Filed: Oct. 20, 2000

(51) Int. Cl.[7] .............................. G06T 5/20; G06T 5/30; G06T 1/20
(52) U.S. Cl. ....................... 382/260; 382/302; 382/308
(58) Field of Search ................................. 382/260, 257, 382/303, 304, 302, 308, 307; 708/300, 308

(56) References Cited

U.S. PATENT DOCUMENTS 4,692,944 A * 9/1987 Masuzaki et al. ........... 382/304
5,046,190 A * 9/1991 Daniel et al. ................ 382/303

FOREIGN PATENT DOCUMENTS

EP           518 462 A2 * 12/1992 ........... G06F/15/62

* cited by examiner

Primary Examiner—Scott Rogers

(57) ABSTRACT

A high speed image processing apparatus comprising a central processing unit and a memory to store images wherein a program directs the central processing unit to perform a poly-point operation on image data. Poly-point operations filter images without multiplication or division yet achieve versatile filter characteristics. Poly-point operations accomplish linear or non-linear filter operations quickly and allow complex image processing operations on general purpose computing apparatus.

9 Claims, 17 Drawing Sheets

160

170

180

200

210

430

440

450

400

460

470

730

740

800

S_1

810

S_2

820

S_3

830

S_4

840

S_5

850

S_6

900

910

920

930

940

IMAGE PROCESSING APPARATUS USING A CASCADE OF POLY-POINT OPERATIONS

U.S. PATENT REFERENCES

1. U.S. Pat. No. 5,315,700 entitled, "Method and Apparatus for Rapidly Processing Data Sequences", by Johnston et al, May 24, 1994
2. U.S. Pat. No. 6,130,967 entitled, "Method and Apparatus for a Reduced Instruction Set Architecture for Multidimensional Image Processing", by Shih-Jong J. Lee, et. al., Oct. 10, 2000
3. Pending application Ser. No. 08/888116 entitled, "Method and Apparatus for Semiconductor Wafer and LCD Inspection Using Multidimensional Image Decomposition and Synthesis", by Shih-Jong J. Lee, et. al., filed Jul. 3, 1997
4. U.S. Pat. No. 6,122,397 entitled, "Method and Apparatus for Maskless Semiconductor and Liquid Crystal Display Inspection", by Shih-Jong J. Lee, et. al., Sep. 19, 2000
5. Pending application Ser. No. 08/888,119 entitled, "Method and Apparatus for Incremental Concurrent Learning in Automatic Semiconductor Wafer and Liquid Crystal Display Defect Classification", by Shih-Jong J. Lee et. al., filed Jul. 3, 1997

CO-PENDING U.S. PATENT APPLICATIONS INCORPORATED BY REFERENCE INTO THIS APPLICATION

1. Co-Pending U.S. patent application Ser. No. 09/693,723 entitled, "Image Processing System with Enhanced Processing and Memory Management" by Shih-Jong J. Lee, et. al.
2. Co-Pending patent application Ser. No. 09/692,948 entitled, "High Speed Image Processing Using a Cascade of Elongated Filters Programmed in a Computer", by Shih-Jong J. Lee, et. al.

BACKGROUND OF THE INVENTION

Conventional approaches for image processing implement image operations directly from their specifications. These approaches demand significant computational resources. For example, a 3 by 3 image convolution requires 9 multiplications, 8 additions, and one division for each pixel in an image. In the prior art solution, floating point operations may be required in order to express the fine detail of the filter kernel and to normalize the result. The precision required for these computations frequently is not consistent with the quantization and sampling of the input image, which is limited to reduce the image storage and transmission requirement. As the image coding (number of pixels, color quantization and luminance quantization) becomes more complete, the computations required to process even simple algorithms becomes overwhelming because of the increase in volume of data. Prior art image processors have been created to meet the demands of current generation images. Specialized hardware has been created to address the high computational demand. However, the specialized hardware is expensive and difficult to program and the result achieved is not worth the effort expended. In the prior art, little effort has been expended to reduce the complexity of the computation; rather the prior art attempts to meet the complexity with increased facility. Moreover, general large kernel or three-dimensional image processing operations are still prohibitively expensive even with the specialized hardware.

The prior art has expended the resources to implement the computations required for the general solution of the image processing problem, the capacity requirements generally exceed those available on general purpose computers like the Personal Computer (PC). Thus, the technical advances in general purpose PCs and the price advantages have not heretofore replaced the specialized image processing hardware.

The programming tasks for the specialized hardware are complex because computation optimization frequently requires assembly level instructions, management of several different types of computing resources, several different types of development tools, parallel processing with interleaved results, and/or use of highly optimized primitive functions provided by a hardware vendor that are not easily tailored to any particular application.

OBJECTS AND ADVANTAGES

An object of the invention is to allow general purpose computers to replace costly specialized image processing hardware without sacrificing speed or reducing image processing capability. It is another object of the invention to achieve high speed by cascading simple, easily programmable poly-point operations in general purpose computers. Another object is to allow image processing programming in high level programming language such as C, C++ or Java that can be compiled into different general purpose computing platforms. A further object is to enable enough throughput improvement that real time image processing can be accomplished in resource constrained mobile computing or information-appliance/e-appliance platforms. It is an object of the invention to enable real time high performance image processing capability for industrial, scientific and medical applications using lower cost computing facilities or image processing units with an embedded central processing unit. Another object of the invention is to allow an increase of image processing capability with minimal additional development work or cost when speed and capacity of the central processing unit (CPU) and memory hardware increases and multiple CPUs and memory channels become available for use.

DESCRIPTION OF THE PREFERRED AND ALTERNATE EMBODIMENTS

Figure 1:
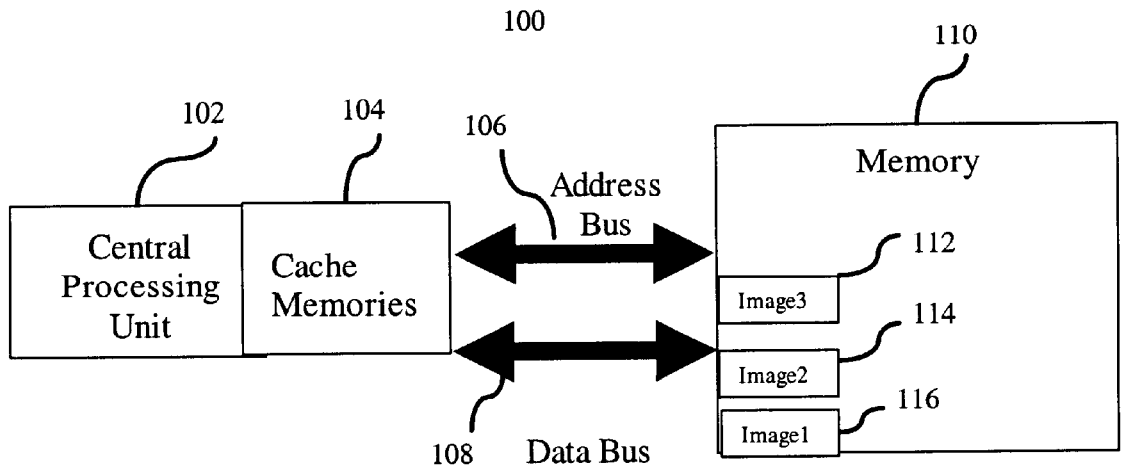
FIG. 1 shows a hardware architecture for Poly-Point image processing.

Referring to FIG. 1, a computer 100 has at least one Central Processing Unit (CPU) 102 and one memory module 110. Simple computers could have the CPU and memory on a single chip. More complicated computers may have multiple CPUs and multiple memory boards. This invention stores an image as a contiguous block in memory or other convenient way for memory addressing. Multiple images 112, 114, 116 can be efficiently stored and accessed. The interface between the CPU and the memory is through an address bus 106 and a data bus 108. Most CPUs have on-chip or external high speed cache memories 104. This architecture exists on almost all computers. The memory access can be under the control of the CPU or through a Direct Memory Access (DMA) module.

Images are efficiently accessed by sequentially incrementing the address corresponding to single or multiple memory locations depending upon word length and pixel quantization. Poly-point operations (or simply point operations) are performed in the CPU on data loaded from the memory addressed. Poly-point operations can be complex and may include any mathematical operation that uses a pixel value as input. The results of the poly-point operations are stored in either an internal buffer, cache memory or an image in memory. The poly-point image operations can be carried out by the steps shown in FIG. 2 130.

Figure 2:
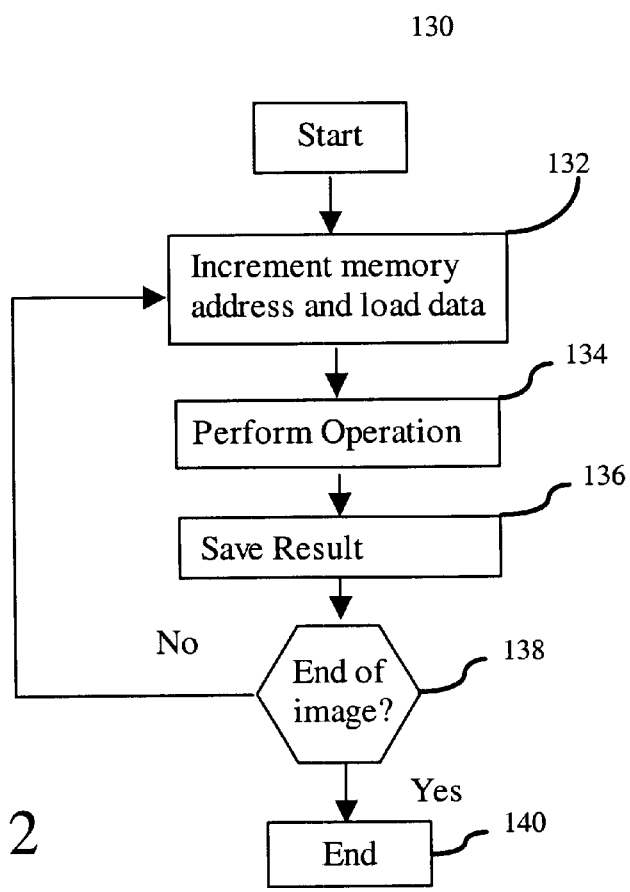
FIG. 2 shows a processing flow diagram for the steps in performing a poly-point image operation.
Figure 3A:
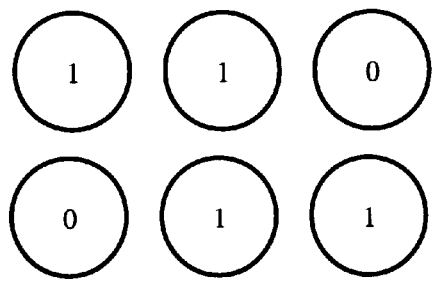
FIG. 3A shows a first quad point kernel for use in creating a 32 point linear filter programmed as a cascade of three quad point filters.
Figure 3B:
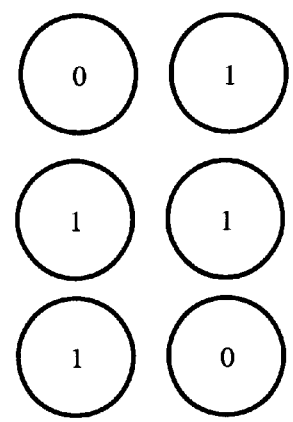
FIG. 3B shows a second quad point kernel for use in creating a 32 point linear filter programmed as a cascade of three quad point filters.
Figure 3C:
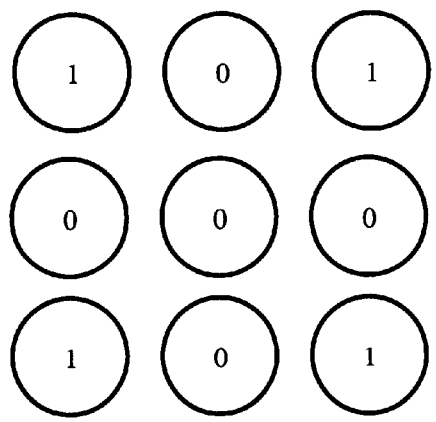
FIG. 3C shows a third quad point kernel for use in creating a 32 point linear filter programmed as a cascade of three quad point filters.

As shown in FIG. 2, memory addresses are incremented sequentially 132 and data associated with the addressed memories are loaded into the CPU 102. The desired operation is performed on the data 134 and the result of the operation is saved to an internal buffer or memory 136. A check is performed to determine whether the whole image is processed 138. If the whole image is processed, the poly-point image operation is completed 140. Otherwise, the memory addresses are incremented 132 and the steps are repeated.

Many memory capacity, access and processing speed up features are built into general purpose CPUs. For example, the Intel® Pentium® III processor integrates the P6

Dynamic Execution micro-architecture, Dual Independent Bus (DIB) Architecture, a multi-transaction system bus, Intel® MMX™ media enhancement technology, and Internet Streaming SIMD (Single Instruction Multiple Data) Extensions. It also includes Advanced Transfer Cache and Advanced System Buffering to achieve higher data bandwidth. It has memory cache-ability up to 4 GB of addressable memory space and system memory scalability up to 64 GB of physical memory that allows the storage of a huge number of images (Intel Pentium® III Processor for SC242 at 450 MHz to 1.13 GHz Datasheet). PowerPC 7400 uses AltiVec technology vector processing units to speed processing (see http://www.altivec.org for a complete list of AltiVec related papers and articles, including technology overviews).

The poly-point image operations in this invention are simple and predictable. The simplicity and predictability improves the efficiency of memory caching and operation predictions that are built into many CPUs. This invention uses a cascade of poly-point operations to achieve high speed linear filtering and morphological operations that form the bases of most neighborhood based image processing functions.

Filtering is conventionally achieved by neighborhood convolutions. This invention can efficiently achieve the same or equivalent neighborhood convolutions by a simple program that performs a cascade of poly-point additions/subtractions. The poly-points to be added are from different locations of the same image (an exception would be motion detection). This can be efficiently programmed as additions of different memory locations that increment simultaneously. For example, a quad-point addition can be programmed as the sum of four incremental memory contents as follows:

I_out[++i]=I_in[i]+I_in[j++]+I_in[k++]+I_in[l++];

The memory pointers i, j, k and l are offset according to the kernel specification.

The simple addressing mode of image memory allows efficient use of prefetch and cache-ability instructions provided by the CPU. For example, a substantial portion, the neighborhood portion, of the input image could be loaded into the cache memory 104 to facilitate high speed processing.

Figure 4A:
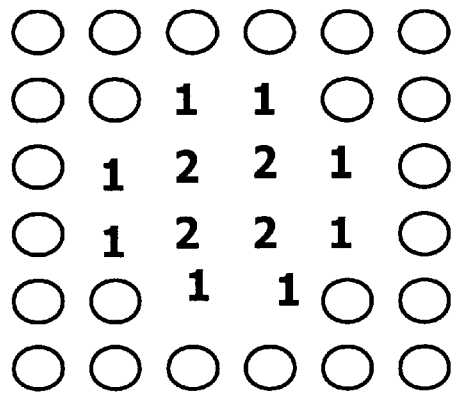
FIG. 4A shows the intermediate filter result for a cascade of the first and second quad point kernels shown in FIGS. 3A and 3B.
Figure 4B:
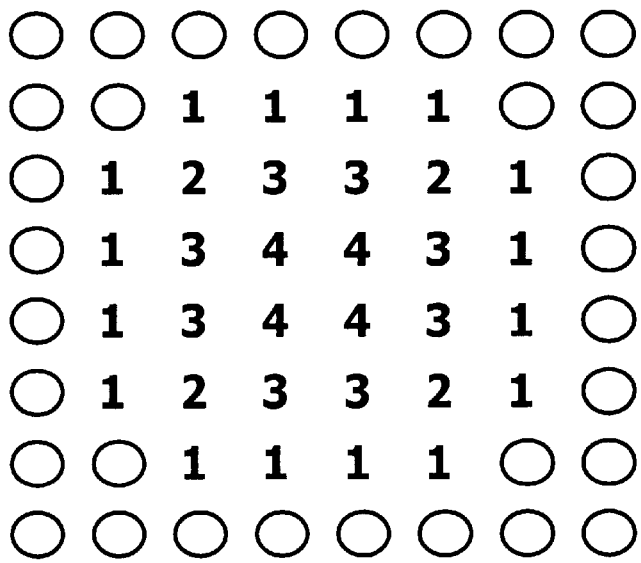
FIG. 4B shows the 32 point linear filter equivalent of a cascade of 3 quad point filters shown in FIGS. 3A, 3B, and 3C.

FIG. 4B shows a 32 point linear filter that can be programmed as cascade of three quad-point kernels shown in FIG. 3A, 160, FIG. 3B, 170, and FIG. 3C, 180. Here the quad-point name stems from the four unit values in each kernel. As will be apparent to those skilled in the art, similar kernels with fewer or more values could also be used. The kernels are selected to ease the processing demand yet achieve a computationally efficient filtering result. Note that all the primitive kernels 160, 170, 180 have four unit coefficients. These coefficients render the multiplication operation in convolution moot, since the result of multiplication by 1 or zero is identical to the value being multiplied or it is zero. Thus, no time needs to be spent performing the multiplication operation. Only addition is required to convolve these kernels with each other or with input image pixels. In addition, because the kernels are small, few pixels need to be retrieved from memory to compute the output result. All operations are integer. Pixels may be typically expressed in integer 8 bit values. To maintain 8 bit values for the output image and to normalize the output result, a right shift of 2 bits (effectively divide by 4) can be applied as part of the operation. Filters involving non-unity values (requiring multiplication) or large size kernels are broken down into a sequence of small, simple and fast addition (and bit shift) operations. The particular small kernels selected are chosen to approximate the characteristics of the filter they replace. The shapes of filters that can result from differing combinations of these basic filters approximates very well behaved traditional filters and thus produces most of their performance while at the same time creating a large decrease in computational load for the CPU. In the conventional approach, a 32 point linear filter requires 32 multiplications, 31 additions, and a divide for each pixel. Depending upon the kernel, floating point operations may also be required. Yet, the result achieved may not be significantly different than what could be achieved with the simpler approach described herein. In the example, the quad-point operations only require 12 additions and three 2 bit shifts per output pixel value.

To illustrate how this approach develops complex filter shape or large size kernels, the example kernels 160, 170, 180 are combined. 160 combined with 170 produces 200 (FIG. 4A). Therefore, convolving 160 and 170 with an input image to produce a result1 is equivalent to filtering of the same input image with 200. But the time required is less using the multi-step primitive kernels 160, 170. Cascading 180 with Result1 to produce Result2 is equivalent to filtering of the input image with 210. Again, it will be clear that time is saved. As will be apparent, the time saved becomes dramatically large where large kernel size or multi-dimensional filters are involved. Note that the principle of simple kernels with unit values can be used to produce a wide variety of filters. The kernels are not restricted to quad element figures, as in this example, but can be constructed from a variety of primitive kernels.

Figure 5:
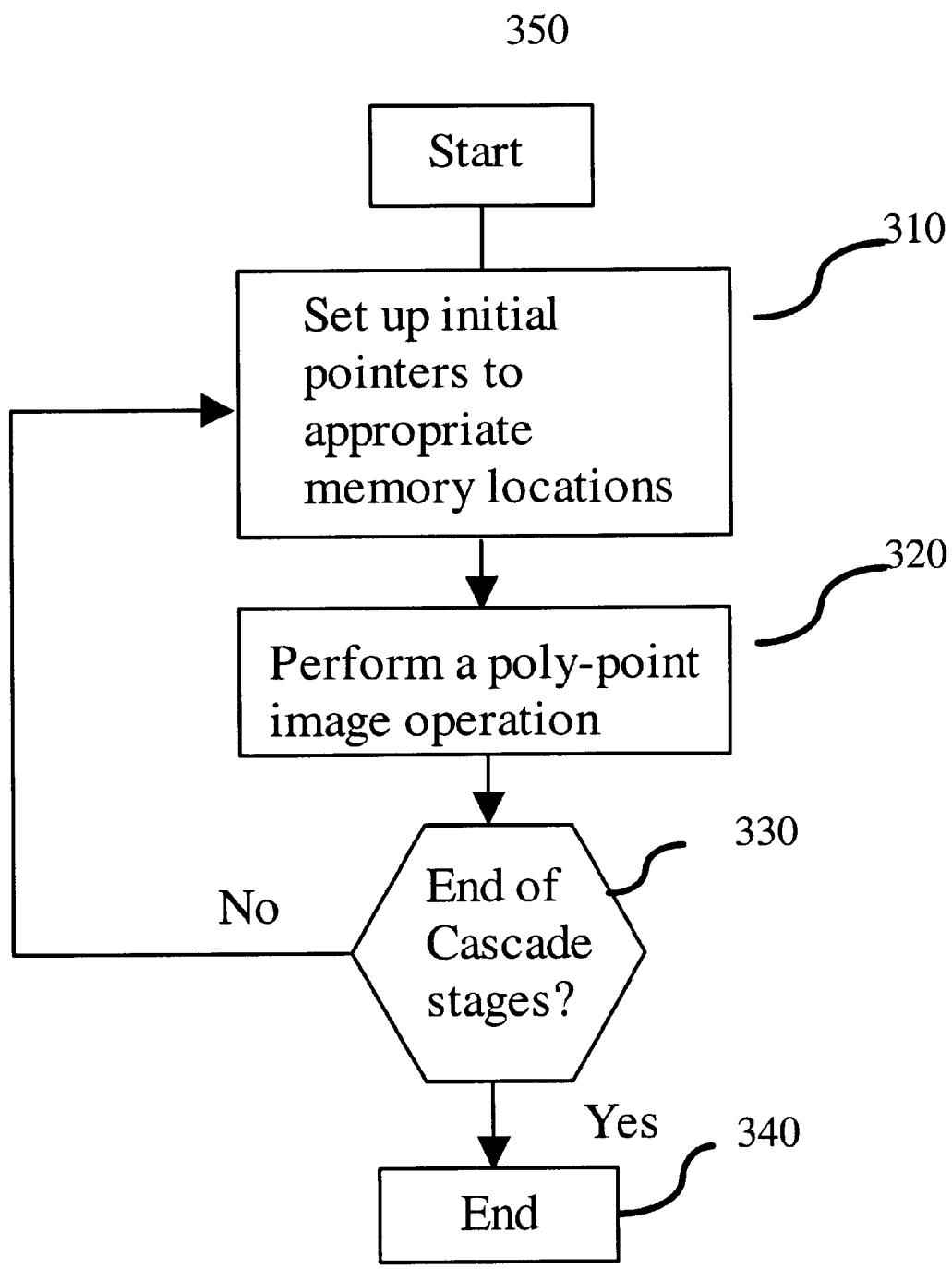
FIG. 5 shows the method for performing a cascade of poly-point operations.
Figure 6A:
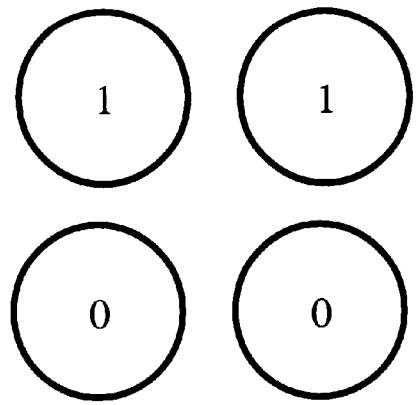
FIG. 6A shows part 1 of six dual point additions that cascade to form a 32 point linear filter.
Figure 6B:
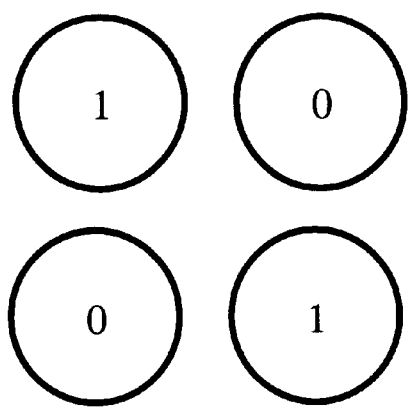
FIG. 6B shows part 2 of six dual point additions that cascade to form a 32 point linear filter.
Figure 6C:
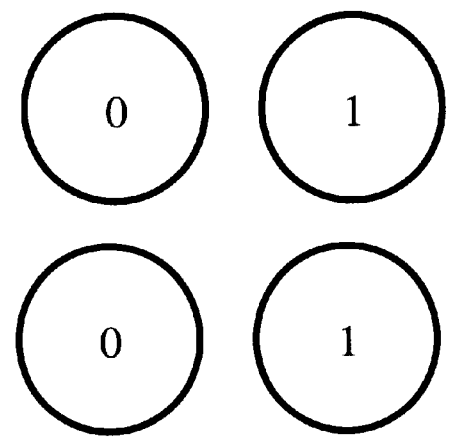
FIG. 6C shows part 3 of six dual point additions that cascade to form a 32 point linear filter.
Figure 6D:
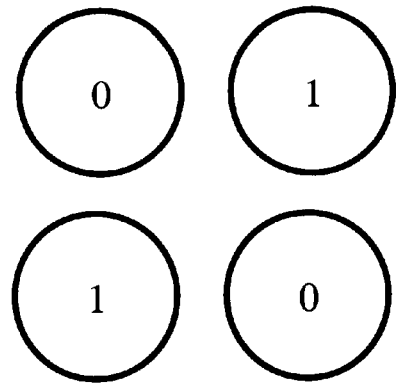
FIG. 6D shows part 4 of six dual point additions that cascade to form a 32 point linear filter.
Figure 6E:
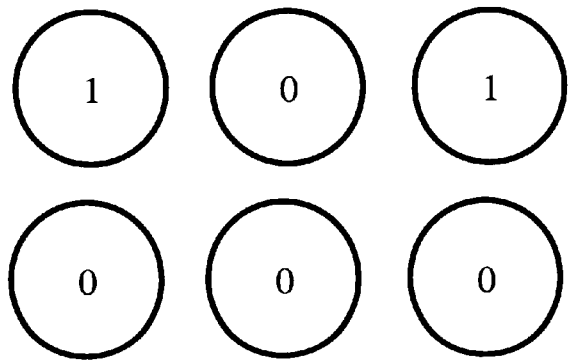
FIG. 6E shows part 5 of six dual point additions that cascade to form a 32 point linear filter.
Figure 6F:
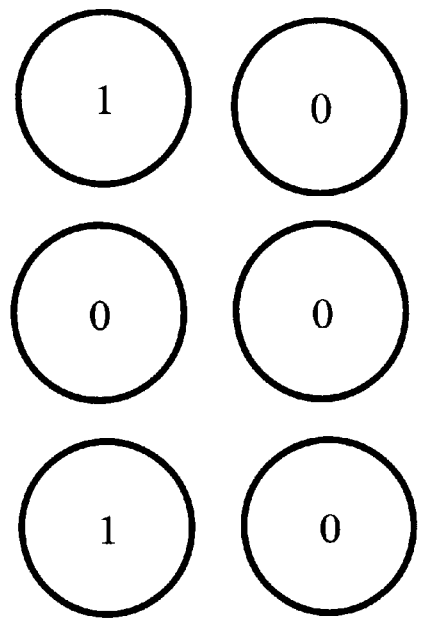
FIG. 6F shows part 6 of six dual point additions that cascade to form a 32 point linear filter.
Figure 7A:
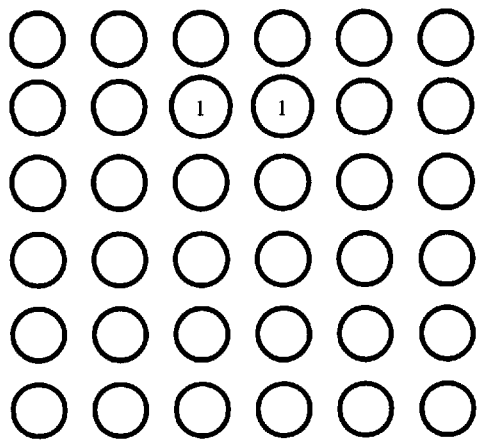
FIG. 7A shows the intermediate result of 6A of the 6 dual point additions.
Figure 7B:
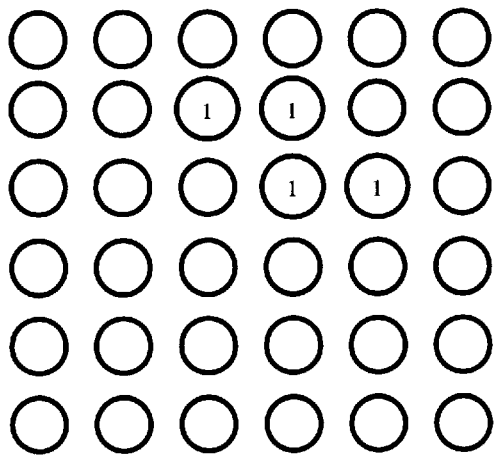
FIG. 7B shows the intermediate result of 6A cascaded with 6B of the 6 dual point additions.
Figure 7C:
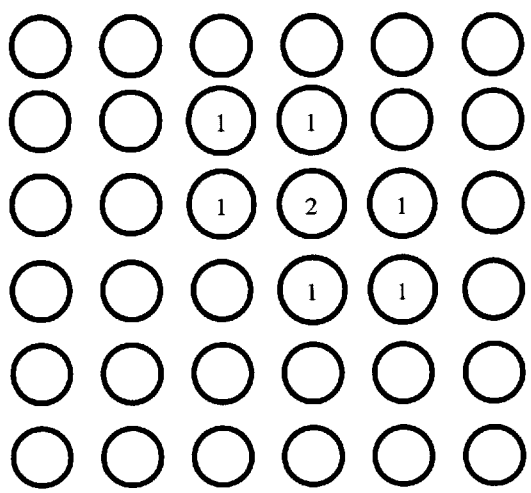
FIG. 7C shows the intermediate result of 6A cascaded with 6B cascaded with 6C.
Figure 7D:
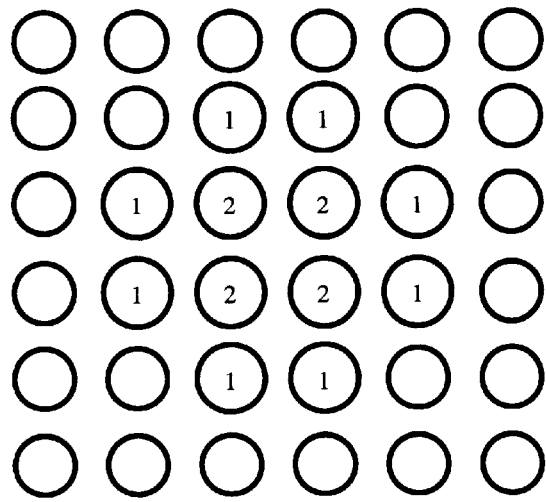
FIG. 7D shows the intermediate result of 6A cascaded with 6B, 6C, and 6D.
Figure 7E:
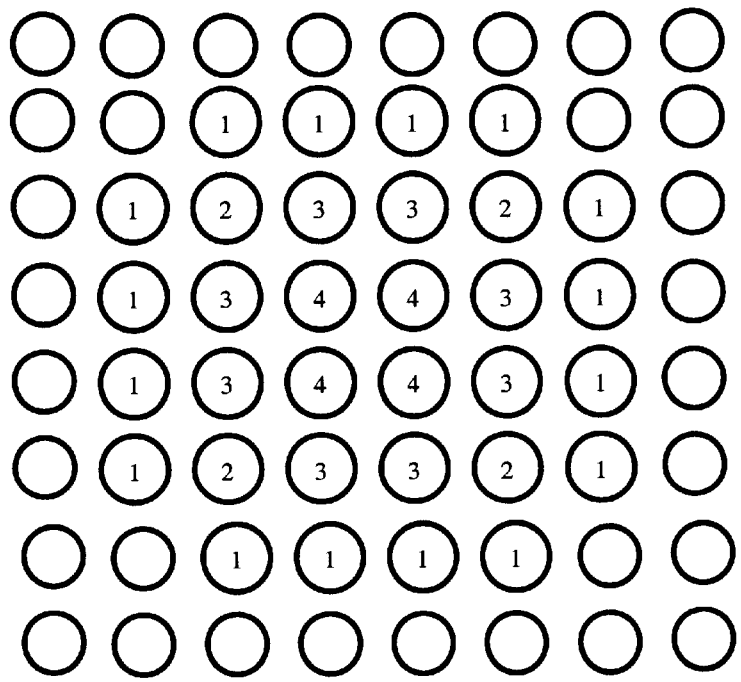
FIG. 7E shows the 32 point linear filter result of the cascade of all 6 dual point additions.

The steps for performing a cascade of the poly-point operations are shown in FIG. 5 350. In step 310 memory address pointers are setup according to the size and shape of the kernel for the poly-point operation. Poly-point operation is performed for the entire image, 320. A check is performed 330 to determine whether all stages in the image filter cascade are completed. If all stages are completed 340, the image filtering function is completed. Otherwise, the memory address pointers are set up for the next poly-point operation 310 and the steps are repeated.

In one embodiment of the invention, the operations as shown in FIG. 5 350 can be programmed in the pseudo codes as follows:

char I[image_size], I_out[image_size], I_2[image_size];
register int i, j, k, l;
For (i=-1, j=0, k=line_length, l=line_length+1; i<image_size;)
 I_out[++i]=(I[i]+I[j++]+I[k++]+I[l++])>>2;
For (i=-1, j=line_length-2, k=line_length-1l=j+line_length; i<image_size;)
 I_2[++i]=(I_out[i]+I_out[j++]+I_out[k++]+I_out[l++])>>2;
For (i=-1, j=1, k=2*line_length-1, l=k+2; i<image_size;)
 I_out[++i]=(I_2[i]+I_2[j++]+I_2[k++]+I_2[l++])>>2;

In this implementation, image memories are declared as arrays in a software program. Registers are used for the address pointer to increase the access speed. "line_length" is the length of each line of the image. "image_size" is the size of the image. The program is very simple and straightforward so it can be easily optimized or written in C/C++, Java, assembly language or other computer languages for the best performance. Additional programs may be written to handle image boundary conditions. As an example, each line of an image can be filtered in its entirety by extending image memory to include extra data for boundary condition handling. Alternatively, the boundary condition management can be done one line at a time. The origin of each kernel can affect a shift in the image position that can also be dealt with as part of the boundary condition.

The same 32 point linear filtering can be programmed as a cascade of six dual-point additions as shown in FIG. 6. The cascade of kernels of FIG. 6 are equivalent to a larger kernel which is developed in FIG. 7 wherein poly-point operations are cascaded beginning with 400, cascaded with 410 to produce 460, cascaded with 420 to produce 470, cascaded with 430 to produce 480, and cascaded with 440 and 450 to produce 490. Cascading very small kernels may be appropriate for CPU's with slower ALU yet fast memory speed. The dual-point operations only require 6 additions for each pixel. This compares favorably to the prior art approach that requires 32 multiplications and 31 additions per pixel. In one embodiment of the invention, the operations of FIG. 6 can be programmed in the pseudo codes as:

char I[image_size], I_out[image_size], I_1[image_size];
register int I, j, k, l;
For (i=0; i<image_size;)
   I_1[i]=(I[i++]+I[i])>>1
For (i=-1, j=line_length; i<image_size;)
   I_out[++i]=(I_1[i]+I_1[j++])>>1;
For (i=-1, j=line_length-1; i<image_size;)
   I_1[++i]=(I_out[i]+I_out[j++])>>1;
For (i=-1, j=line_length-2; i<image_size;)
   I_out[++i]=(I_1[i]+I_1[j++])>>1;
For (i=-1, j=1; i<image_size;)
   I_[++i]=I_out[i]+I_[j++])>>1;
For (i=-1, j=2*line_length-1; i<image_size;)
   I_out[++i]=(I_1[i]+I_1[j++])>>1;

As can be appreciated by those skilled in the art, the poly-point operations do not have to be limited to 2 or 4 points. Poly-point additions can be easily programmed in a general purpose CPU and additions of different points can be cascaded together to form the desired filter kernel in a most efficient fashion for the available computing resource. The number of points per stage of operation can also be flexibly adjusted to match the CPU and memory speed to avoid processing dead time due to CPU or memory bottleneck. Fewer points are used for slower CPU and more points are used for slower memory.

Poly-point filters may operate in conjunction with prior art filters in a system. Certain filter actions may require extreme precision, and others may be capable with a more approximate result. For example, in filtering of color components of an image, lower precision is generally required than is necessary for the luminance information. Poly-point filters may also be cascaded with prior art filters.

Figure 8A:
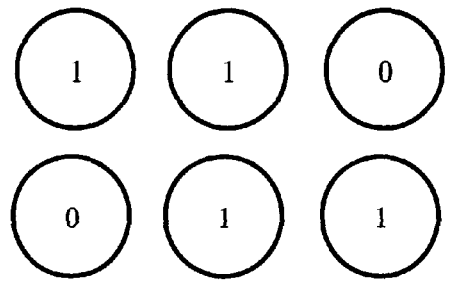
FIG. 8A shows the first of three quad point filters that when cascaded will form the filter shown in FIG. 9B that could be used for vertical edge detection.
Figure 8B:
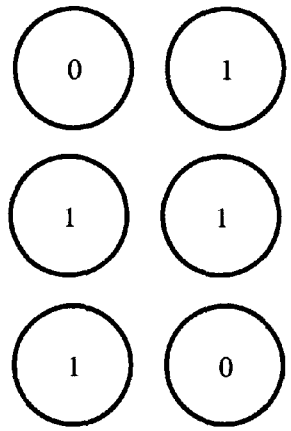
FIG. 8B shows the second of three quad point filters which when cascaded will form the filter shown in FIG. 9B which could be used for vertical edge detection
Figure 8C:
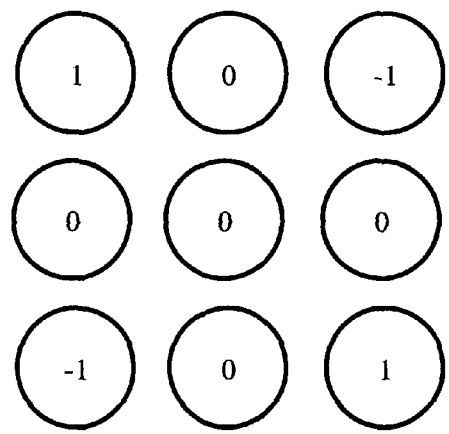
FIG. 8C shows the third of three quad point filters which when cascaded will form the filter shown in FIG. 9B that could be used for vertical edge detection.
Figure 9A:
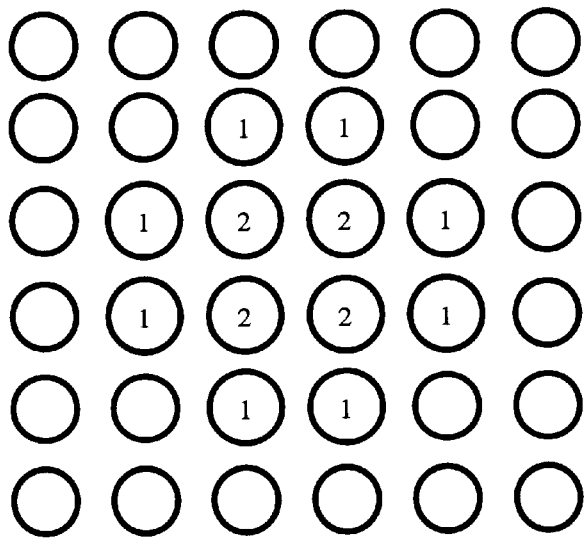
FIG. 9A shows the intermediate filter result from cascading the first and second quad point filters shown in FIGS. 8A, and 8B.
Figure 9B:
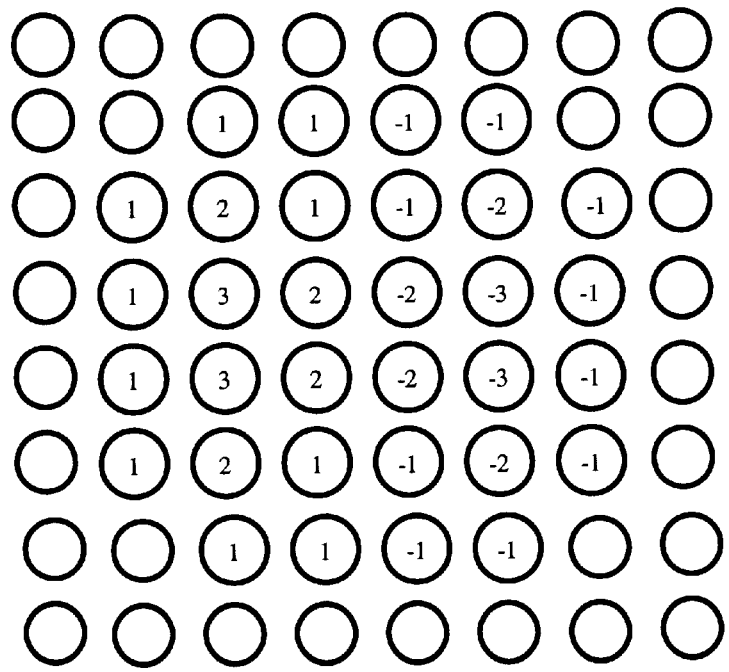
FIG. 9B shows the filter formed by cascading the filters of FIGS. 8A, 8B, and 8C. This filter could be used for vertical edge detection.

This invention is efficient for large kernel filtering. It achieves convolution without multiplication and can be easily used for efficient multi-dimensional processing. For example, tracking of objects in images whose position changes with time may be done using poly-point filtering. Poly-point operations can be created that use subtraction or combination of addition and subtraction to create other linear filters. FIG. 8 shows small changes to FIG. 3C kernel 180 to create a cascade of filters 160, 170, 520 that could be used for vertical edge detection. In this example, 160 is cascaded with 170 to create 200 (FIG. 9A) which is cascaded with 520 to create 620 (FIG. 9B).

Morphologic Filtering by Cascade of Poly-Point Maximum/Minimum

Figure 10A:
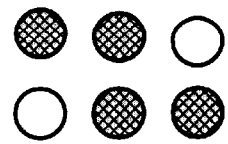
FIG. 10A shows the first of three quad point maximum kernels used to perform a 32 point grayscale morphological dilation programmed as cascade of three quad-point maximum kernels wherein each darkened element indicates part of the maximum function.
Figure 10B:
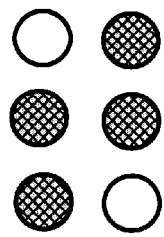
FIG. 10B shows the second of three quad point maximum kernels used to perform a 32 point grayscale morphological dilation programmed as cascade of three quad-point maximum kernels wherein each darkened element indicates part of the maximum function.
Figure 10C:
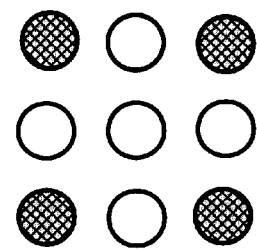
FIG. 10C shows the third of three quad point maximum kernels used to perform a 32 point grayscale morphological dilation programmed as cascade of three quad-point maximum kernels wherein each darkened element indicates part of the maximum function.
Figure 11A:
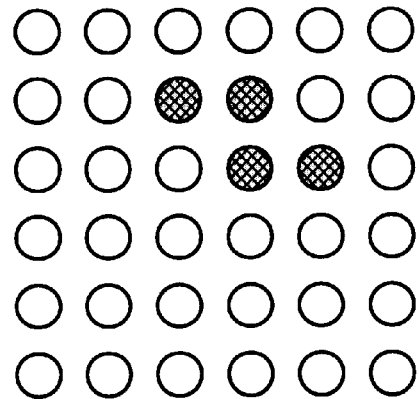
FIG. 11A shows the first maximum operator for the 32 point grayscale morphological dilation.
Figure 11B:
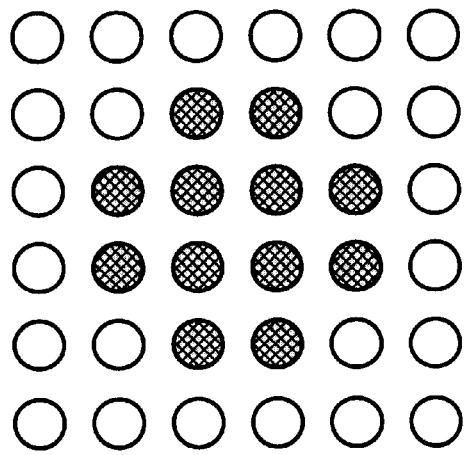
FIG. 11B shows the cascade result of the first and second maximum operators of FIGS. 10A and 10B.
Figure 11C:
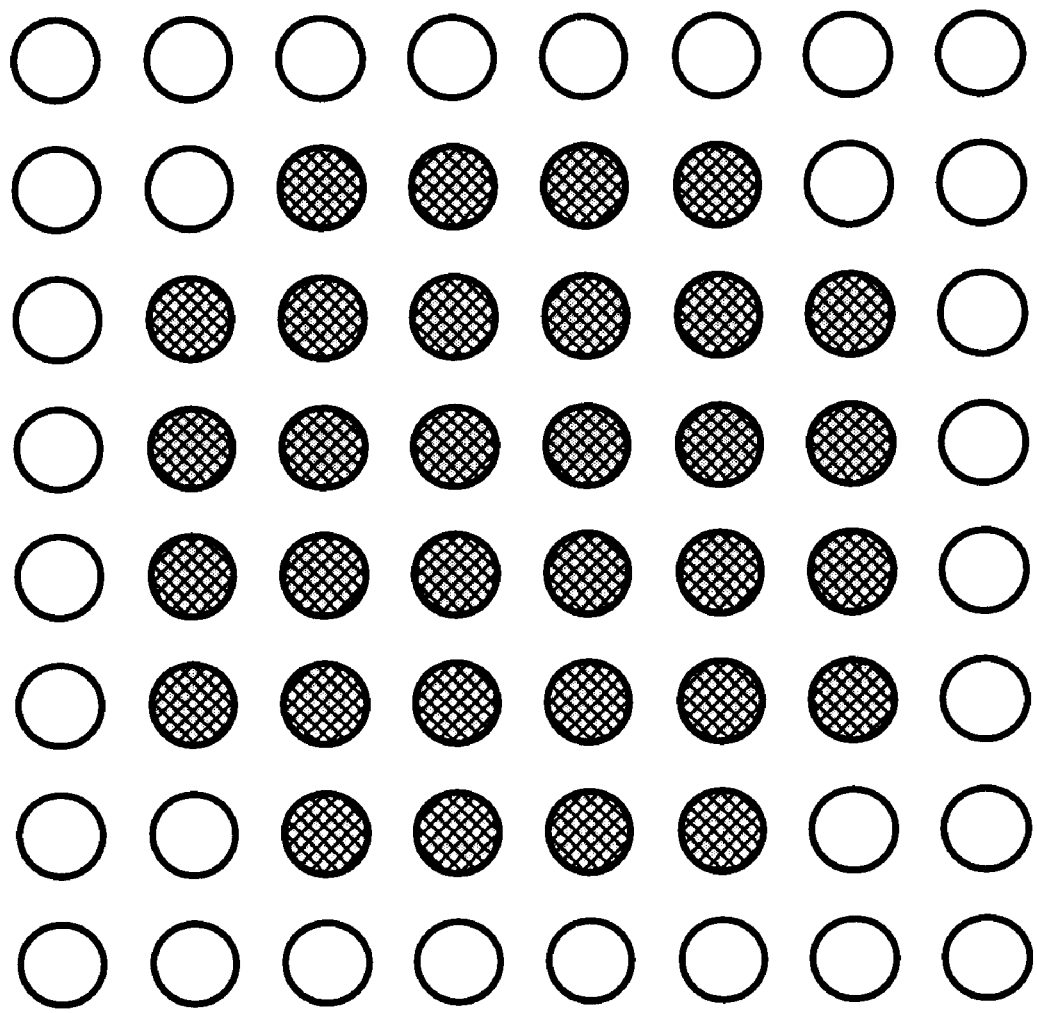
FIG. 11C shows the cascade result of the first, second, and third quad-point maximum operators to form a 32 point grayscale morphological dilation.
Figure 12A:
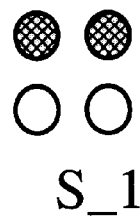
FIG. 12A shows the first of 6 dual point maximum operators used to form a 32 point grayscale morphological dilation programmed as cascade of six dual-point maximum.
Figure 12B:
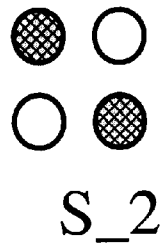
FIG. 12B shows the second of 6 dual point maximum operators used to form a 32 point grayscale morphological dilation programmed as cascade of six dual-point maximum.
Figure 12C:
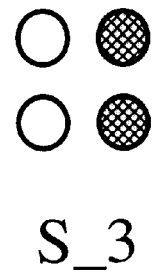
FIG. 12C shows the third of 6 dual point maximum operators used to form a 32 point grayscale morphological dilation programmed as cascade of six dual-point maximum.
Figure 12D:
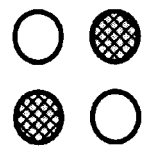
FIG. 12D shows the fourth of 6 dual point maximum operators used to form a 32 point grayscale morphological dilation programmed as cascade of six dual-point maximum.
Figure 12E:
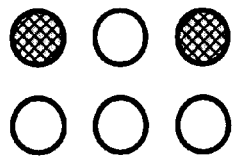
FIG. 12E shows the fifth of 6 dual point maximum operators used to form a 32 point grayscale morphological dilation programmed as cascade of six dual-point maximum.
Figure 12F:
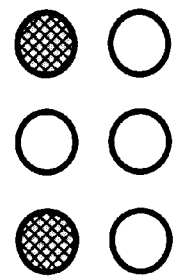
FIG. 12F shows the sixth of 6 dual point maximum operators used to form a 32 point grayscale morphological dilation programmed as cascade of six dual-point maximum.
Figure 13A:
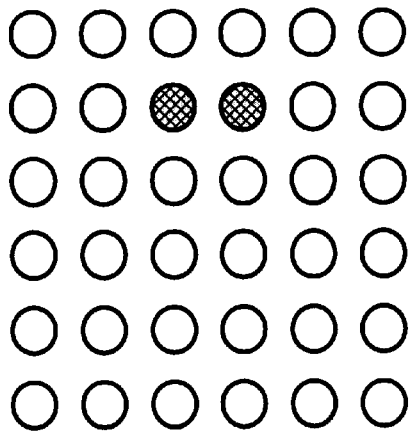
FIG. 13A shows the intermediate result of the first of 6 dual point maximum operators used to form a 32 point grayscale morphological dilation programmed as cascade of six dual-point maximum.
Figure 13B:
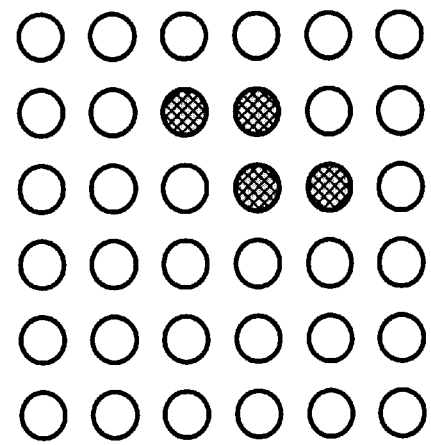
FIG. 13B shows the intermediate result of combining the first and second dual point maximum operators shown in FIGS. 12A, and 12B.
Figure 13C:
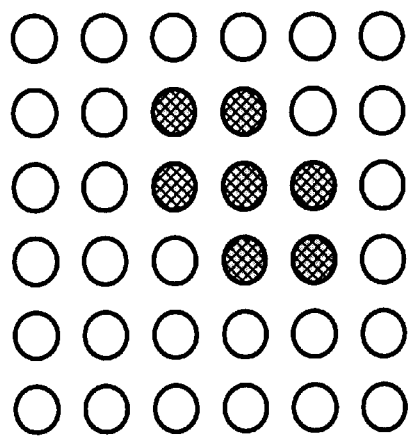
FIG. 13C shows the intermediate result of combining the first, second and third dual point maximum operators shown in FIGS. 12A, 12B, and 12C.
Figure 13D:
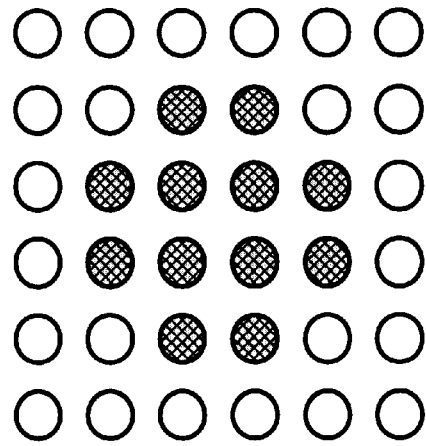
FIG. 13D shows the intermediate result of combining the first, second, third and fourth dual point maximum operators shown in FIGS. 12A, 12B, 12C, and 12D.
Figure 13E:
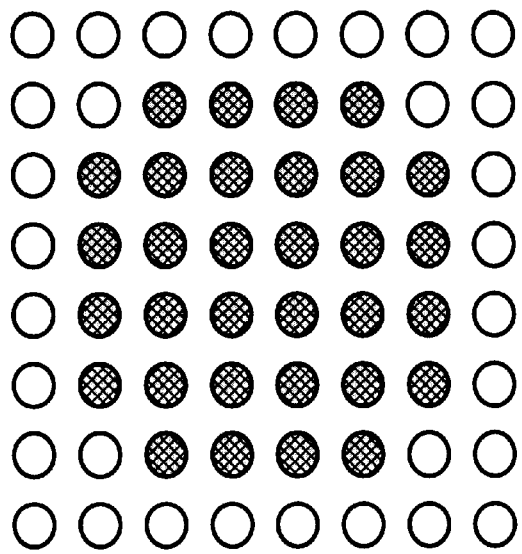
FIG. 13E shows the result of combining all six dual point maximum operators shown in FIG. 12.

Similar to linear filters, morphologic filtering is conventionally achieved by neighborhood operations. This invention can efficiently achieve the same operations by a simple program that performs cascade of poly-point maximum/minimum. The poly-points to be operated are from different locations of the same image. This can be efficiently programmed as maximum/minimum of different memory locations that increment simultaneously. For example, a quad-point maximum can be programmed as the maximum of four incremental memory contents as follows:

I_out[++i]=MAX(MAX(I_in[i], I_in [j++]), MAX(I_in[k++], I_in[l++]));

Where memory pointers i, j, k and l are offset according to the specification of the kernel. FIG. 10 and FIG. 11 shows 32 point grayscale morphological dilation 750 programmed as a cascade of three quad-point maximum kernels 700, 710, 720. Wherein the maximum associated value of each of the 4 darkened elements of the kernels replaces the value of the pixel in the image being filtered. Note that fewer and more closely grouped pixels from the image are required to perform any individual filtering operation. This speeds up memory access. In addition, 12 overall maximum operations are performed per pixel instead of 32. In one embodiment of the invention, the operations can be programmed in pseudo code as:

char I[image_size], I_out[image_size], I_2[image_size];
register int i, j, k, l;
For (i=-1, j=0, k=line_length, l=line_length+1; i<image_size;)
   I_out[++i]=MAX(MAX(I[i], I[j++]), MAX(I[k++], I[l++]));
For (i=-1, j=line_length-2, k=line_length-1, l=j+line_length; i<image_size;)
   I_2[++i]=MAX( MAX(I_out[i], I_out[j++]), MAX(I_out[k++], I_out[l++]));
For (i=-1, j=1, k=2*line_length-1, l=k+2; i<image_size;)
   I_out[++i]=MAX(MAX(I_2[i], I_2[j++]), MAX(I_2[k++], I_2[l++]));

The same 32 point grayscale morphological dilation can be programmed as cascade of six dual-point maximum as shown in FIGS. 12 and 13 wherein the maximum value of each of two darkened elements of the kernels 800, 810, 820, 830, 840 and 850 replaces the value of the pixel in the image being filtered. In this example, the two element maximum operators 800 and 810 in combination effect the maximum operator 910. The combination of 800, 810, and 820, effect a maximum operator 920. The combination of 800, 810, 820 and 830 effect a maximum operator 930. The combination of 800, 810, 820, 830, 840 and 850 effect a maximum operator 940. In comparison with the quad-point operators of FIG. 10 that produce the same result, this may be appropriate for CPU's with slower ALU yet fast memory assess speed. Alternatively, an intermediate result 910, 920, or 930 may be desired as an output.

In one embodiment of the invention, the operations of FIG. 12 can be programmed in pseudo codes as:
char I[image_size], I_out[image_size], I_1[image_size];
Register int I, j, k, l;
For (i=0; i<image_size;)
   I_1[i]=MAX (I[i++], I[i]);
For (i=-1, j=line_length; i<image_size;)
   I_out[++i]=MAX (I_1[i], I_1[j++]);
For (i=-1, j=line_length-1; i<image_size;)
   I_1[++i]=MAX (I_out[I], I_out[++]);
For (i=-1, j=line_length-2; i<image_size;)
   I_out[++i]=MAX (I_1[i], I_1[j++]);
For (i=-1, j=1; i<image_size;)
   I_1[++i]=MAX (I_out[i], I_out[++]);

For (i=-1, j=2*line_length-1; i<image_size;)
  I_out[++i]=MAX (I_1[i], I_1[j++]);

As can be appreciated by those skilled in the art, the poly-point operations do not have to be limited to 2 or 4 points. Poly-point maximum can be easily programmed in a general purpose CPU and the neighborhood maximum of different points can be cascaded together to form the desired structuring element in the most efficient fashion for the available computing resource. The number of points per stage of operation can also be flexibly adjusted to match the CPU and memory speed to avoid processing dead time due to CPU or memory bottleneck. Fewer points are used for slower CPUs and more points are used for slower memory.

This invention is very efficient for large kernel morphological operations. It can be easily applied to highly efficient multi-dimensional processing. The operations can also be expanded. Changing the neighborhood operator from maximum to minimum will change dilation into erosion. Combinations of dilation and erosion will create morphological opening, closing and hit-or-miss transformation. From the hit-or-miss transformation, morphological thinning and thickening operations can be created.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices, and that various modifications, both as to the equipment details and operating procedures, can be accomplished without departing from the scope of the invention itself.

What is claimed is:

1. A high speed image processing apparatus that implements a linear filter without multiplications comprising:
   a. a general purpose computer;
   b. means to program a poly-point linear filter selected from the set consisting of additions and subtractions of a plurality of memory locations with a fixed offset incremented as a group in the general purpose computer;
   c. means to execute the program to create a linear filter output.

2. The apparatus of claim 1 wherein the additions and subtractions are followed by bit shifts.

3. The apparatus of claim 1 wherein the program includes means for processing image boundary conditions.

4. The apparatus of claim 1 further comprising a program to perform a cascade of poly-point linear filters to generate a linear filter result with more kernel points than the sum of the kernel points from each of the poly-point linear filters used.

5. The apparatus of claim 1 wherein the linear filter is a multi-dimensional linear filter.

6. The apparatus of claim 1 wherein at least one poly-point linear filter is cascaded with a conventional linear filter to improve processing speed.

7. A high speed image processing apparatus for morphologic filtering comprising:
   a. a general purpose computer;
   b. means to program a poly-point morphologic filter selected from the set consisting of maximum and minimum of a plurality of memory locations with a fixed offset incremented as a group in the general purpose computer;
   c. a program to perform cascade of poly-point morphologic filters to generate a morphologic filter result with more kernel points than the sum of kernel points from each of the poly-point morphologic filters used;
   d. means to execute the program resulting in a morphologic filter output.

8. The apparatus of claim 7 wherein the program handles image boundary conditions.

9. The apparatus of claim 7 wherein the morphologic filter is a multi-dimensional morphologic filter.

* * * * *